United States Patent [19]

Moriya et al.

[11] 4,026,831

[45] May 31, 1977

[54] CHELATING POLYMERS BASED ON BIS-EPOXIDES AND POLYAMINES OR POLYIMINES

[75] Inventors: Masafumi Moriya, Tokyo; Kazuo Hosoda, Hoya; Makoto Takai, Chiba, all of Japan

[73] Assignee: Miyoshi Yushi Kabushiki Kaisha, Tokyo, Japan

[22] Filed: Oct. 3, 1974

[21] Appl. No.: 511,692

[30] Foreign Application Priority Data

Oct. 5, 1973   Japan .......................... 48-111508

[52] U.S. Cl. ..................... 260/2.1 R; 260/2 EN; 260/29.2 N; 260/33.4 R
[51] Int. Cl.² ................. C08G 65/02; C08G 73/04; C08J 3/02
[58] Field of Search ............... 260/2 EP, 2 N, 2.1 R

[56] References Cited

UNITED STATES PATENTS

| | | | |
|---|---|---|---|
| 2,296,225 | 9/1942 | Ulrich | 260/2.1 R |
| 3,256,239 | 6/1966 | Williamson et al. | 260/2 N |
| 3,347,802 | 10/1967 | Ashby et al. | 260/2 N |
| 3,758,421 | 9/1973 | Nikles | 260/2 N |
| 3,786,113 | 1/1974 | Vassileff | 260/874 |
| 3,803,237 | 4/1974 | Lednicer et al. | 260/2.1 R |

FOREIGN PATENTS OR APPLICATIONS 761,443   11/1956   United Kingdom
990,030   4/1965   United Kingdom

OTHER PUBLICATIONS

Japanese Patent Application No. 48/47993 (laid open) 1973.

*Primary Examiner*—H.S. Cockeram
*Attorney, Agent, or Firm*—Cushman, Darby & Cushman

[57] ABSTRACT

Polyaddition polymers comprising the reaction products of bis-epoxy compounds with poly-N-substituted polyamines or poly-N-substituted polyalkylene imines, wherein said poly-N-substituted polyamines and said polyalkylene imines contain at least two active hydrogens, and which polyamines and polyalkylene imines contain alkali metal salts or alkyl ester groups of carboxyalkyl groups or cyanoalkyl groups which are substituents on the nitrogen atoms of said polyamines of polyalkylene imines. The polymer is extremely useful for chelating and recovering heavy metal ions from industrial waste liquids and also effective as adhesives, resin for paint, electrostatic inhibitor for polymer, electro-conductive polymer, rust inhibitor ion-exchanging material and the like. The polymer may be obtained in the form of particles of a controlled particle size.

12 Claims, No Drawings

CHELATING POLYMERS BASED ON BIS-EPOXIDES AND POLYAMINES OR POLYIMINES

BACKGROUND OF THE INVENTION a. Field of the invention

The present invention relates to a chelating polymer.

b. Description of the prior art

As polymers having a chelating ability for removing heavy metals, styrene-divinylbenzene copolymer resin having an imino diacetic acid group [$-N(CH_2COOH)_2$] or polyamine group [$-(NHCH_2CH_2)_nNH_2$], and thiourea type resins or dithio carbamic acid type resins produced by introducing into phenolic resins a coordinate group such as sulfur and nitrogen having a higher affinity with heavy metals have been heretofore well known. However, these polymers have a lower heavy metal ion adsorbing (exchanging) ability and a lower adsorbing (exchanging) velocity. They are expensive from the cost point of view and once they adsorbed heavy metals, there is a difficulty in removing the adsorbed heavy metals, therefrom. Recently, the reactivity of a mercapto group was recognized and was used to produce chelating polymers by introducing a mercapto group into cellulose. Although these polymers are attractive, they are still in laboratory investigation and far from being of practical use.

SUMMARY OF THE INVENTION

An object of the present invention is, therefore, to provide a chelating polymer capable of removing promptly, simply, cheaply and effectively detrimental heavy metals contained in industrial waste water exhausted from various industries such as mines, etectrolysis, electric cell, wire, semiconductor, plating, catalyst, fiber, pigment, dye, dyeing, polymer and the like industries and also capable of easily recovering precipitated or adsorbed heavy metals. More particularly, it is to provide a chelating polymer capable of performing chelating reactions with heavy metals detrimental to health such as mercury, cadmium, zinc, copper and lead, to precipitate or adsorb the heavy metals and also capable of easily releasing the precipitated or adsorbed heavy metals to recover them.

Another object of the present invention is to provide a chelating polymer having an ability of removing heavy metal as mentioned above and moreover being extensively useful as a paint and a bonding agent and furthermore as an electrostatic inhibitor for polymer, or as an electroconductive polymer, a dew formation inhibitor, a dispersing agent, a precipitation promotor, adhesives, a gelling agent, a scale removing agent, a combustion retardant, an ion exchanging membrane and an ion exchanging fiber.

These as well as other objects and advantages of the present invention will become apparent by reading the following descriptions.

DETAILED DESCRIPTION OF THE PREFERRED EMBODIMENTS

Under the circumstances as stated above, as a result of extensive research, the present inventors discovered that a water-soluble or insoluble polymer having at least two of tertiary amino groups and at least one of carboxyl groups in a molecule of the polymer is extremely effective for removing and recovering the heavy metals as above. Moreover, said polymer has a property of chelating metals resulting in a higher affinity with metals. It is useful as resin for paint, bonding material, electrostatic inhibitor for synthetic fibers and plastics, electroconductive polymer, dew inhibitor on glass and the like dispersing agent and precipitation promoting agent. Furthermore, water-soluble polymer of said type is expected to be applied as a rust inhibitor, latex adjuvant, thickener, gelling agent, scale removing agent for boilers and the like.

The present polymer is produced by the following three step reaction: the first step comprises a polyaddition reaction of poly-N-substituted polyamines or poly-N-substituted polyalkylene imines, which are obtained by substituting alkali metal salts or alkylesters of carboxyalkyl group or cyanoalkyl group for active hydrogens bonded to nitrogen atom of polyamines or polyalkylene imines in a manner that at least two of said active hydrogens remain, with bis-epoxy compound in a solvent or in the absence of solvent; the second step comprises a curing reaction by adding conventional curing agent for epoxy resins to an epoxy-terminating polymer obtained by using bisepoxide compound of an excess molar ratio in the first step, or by curing a prepolymer itself obtained by using said poly-N-substituted polyamines or poly-N-substituted polyalkyene imines of an excess molar ratio; the third step comprises an acid-saponification reaction or alkali-saponification reaction of the cured polymer or the cured prepolymer obtained in the first or second step when the N-substituent of said poly-N-substituted polyamines or poly-N-substituted polyalkylene imines is an alkylester of a carboxyalkyl group or a cyanoalkyl group in the first step.

More particularly, the reaction of said second step may be carried out by the following method: it comprises shaping the polymer obtained in the first step into a film, and then curing it, and either this cured film is used as is or this film is crushed to produce a powdery or granular cured article having a suitable particle size.

The chelating polymer obtained by the present invention is markedly characterized by the simplicity of its production process. It has a higher velocity of ion-exchanging with various heavy metal ions and an extremely high selectivity, for example, making possible to completely precipitate or remove by adsorption even only a trace of selected heavy metal ion(s) from an aqueous solution having high concentrations of various heavy metal ions. The insoluble polymer has a very high capacity in amount of adsorption (exchanging amount) for various heavy metal ions and exhibits superior performances in the unique manner of epoxy resins, especially marked superiority in chemical durability, alkali-resistance and shock-proofing.

The present invention is in detail explained below.

In the first step, poly-N-substituted polyamines or poly-N-substituted polyalkylene imines having at least two of active hydrogens bonded to a nitrogen atom are reacted with bis-epoxy compounds in a solvent (which is for making stirring easy, preventing gelation and enhancing a physical adsorption of heavy metals due to the porosity of the polymer produced in the subsequent curing reaction in the second step) or in the absence of solvent at a temperature of 50 to 150° C for 1 to 15 hours to produce polymers.

Poly-N-substituted polyamines or poly-N-substituted polyalkylene imines having at least two residual active hydrogens bonded to a nitrogen atom used in the first step of the present process include ethylene diamine diacetonitrile, ethylene diamine dipropionitrile, ethylene diamine di(2-methylpropionitrile), propylene diamine diacetonitrile, propylene diamine propionitrile, propylene diamine di(2-methyl-propionitrile), hexamethylene diamine diacetonitrile, hexamethylene diamine dipropionitrile, hexamethylene diamine di(2-methyl propionitrile ), m-xylene diamine diacetonitrile, m-xylene diamine dipropionitrile, m-xylene diamine di(2-methylpropionitrile); and alkali metal salts or alkylester ($C_1-C_4$) of ethylene diamine diacetic acid, ethylene diamine dipropionic acid, ethylene diamine di(1-methylpropionic acid), ethylene diamine di(2-methyl-propionic acid), propylene diamine diacetic acid, propylene diamine dipropionic acid, propylene diamine di(1-methyl-propionic acid), propylene diamine (2-methyl-propionic acid), hexamethylene diamine diacetic acid, hexamethylene diamine dipropionic acid, hexamethylene diamine di(1-methyl-propionic acid), hexamethylene diamine (2-methyl-propionic acid), m-xylene diamine diacetic acid, m-xylene diamine dipropionic acid, m-xylene diamine di(1-methyl-propionic acid), m-xylene diamine di(2-methyl-propionic acid); and those obtained by substitution by cyanoalkyl group i.e. $(CHR')nCN$ (wherein $R'$ is H or $CH_3$ and $n$ is 1 or 2), or alkali metal salt or alkylester of a carboxyalkyl group i.e. $(CHR')nCOOR$ (wherein $R'$ is H or $CH_3$, $n$ is 1 or 2 and R is an alkali metal or a hydrocarbon group of $C_1$ to $C_4$) of N-alkylethylene diamine, N-alkyl-propylene diamine, N-alkylhexamethylene diamine, N-alkyl-m-xylene diamine, N-alkyl-diethylene triamine, N-alkyl-triethylene tetramine, N-alkyl-triethylene tetramine, N-alkyltetraethylene pentamine, N-alkyl-pentaethylene hexamine, diethylene triamine, triethylene tetramine, tetraethylene pentamine, pentaethylene hexamine, polyethylene imine, poly(2-methyl-ethylene imine), poly(2-ethylethylene imine) poly(2,2-dimethyl ethylene imine), poly(cis-2,3-dimethyl ethylene imine), and the like As the poly-N-substituted polyalkylene imines which are obtained from copolymers of ethylene imine and N-substituted ethylene imine, there can be listed up such copolymers as those of ethylene imine and N-cyanomethyl ethylene imine, ethylene imine and methyl ester of N-ethylene glycine, ethylene imine and N-cyanodimethyl ethylene imine, and ethylene imine and methyl ester of N-carboxyethyl ethylene imine. However, poly-N-substituted polyamines and poly-N-substituted polyalkylene imines used in the present invention are not limited to the above ones. The alkyl group in the above compounds are an alkyl group having 1 to 8 carbon atoms or a hydroxy-alkyl group having 2 to 8 carbon atoms.

Bis-epoxy compounds used in the first step include 1,3-bis(1,2-epoxypropoxy)benzene, 1,4-bis(1,2-epoxypropoxy)benzene, 2,2-bis(p-1,2-epoxypropoxy phenyl)propane, N,N'-bis(2,3-epoxypropyl)piperazine, ethylene glycol diglycidyl ether, propylene glycol diglycidyl ether, penta erythritol diglycidyl ether, glycelol diglycidyl ether, sorbitol diglycidyl ether, polyethylene glycol diglycidyl ether, polypropylene glycol diglycidyl ether, 1,1-bis(p-1,2-epoxypropoxy phenyl)2,3-propanediol, vinylcyclohexene-dioxide, butadiene-dioxide and the like. The above bis-epoxy compounds may be used alone or in combination of two or more thereof. Bis-epoxy compounds used in the second step are not limited to those indicated above.

Organic solvents used in the first step reaction include organic solvents such as benzene, toluene, xylene, butyl-cellosolve, ethanol, isopropyl alcohol, dimethyl formamide, dimethyl sulfoxide, N-methyl pyrrolidone, dioxane, carbon tetrachloride, chloroform, n-hexane, cyclohexane and the like. These may be used alone or in combination as a mixture and moreover, water may be used as a solvent.

The second step reaction, i.e., curing reaction, is explained below.

The method for curing the polymers obtained in the first step comprises shaping the polymers in the form of film and curing the film at a temperature of 60° to 180° C for 2 to 24 hours (when a solvent is used in the first step, the curing is conducted while removing the solvent). Curing agents for epoxy resins used in this curing step reaction include diethylene triamine, triethylene tetramine, tetraethylene pentamine, ethylene diamine, m-xylene diamine, N-aminoethyl piperazine, methaphenylene diamine, diamino-diphenylmethane, diamino-diphenyl sulfone, phthalic anhydride and the like.

Finally, the third step reaction, i.e. saponification reaction is explained. When such poly-N-substituted polyamines or poly-N-substituted polyalkylene imines as their N-substituent being a cyano-alkyl group or an alkylester of a carboxyalkyl group are used in the first step, the linear polymer (liquid polymer) obtained in the first step is saponified with an appropriate amount of an aqueous alkali solution or mineral acid (5 to 30 wt.%) at a temperature of 60° to 100° C for 1 to 5 hours to produce in most cases a water-soluble polymer. The cured polymer (solid polymer) obtained in the second reaction is saponified in an aqueous alkali solution or mineral acid of 1 to 20% by weight at a temperature of 60° to 100° C for 1 to 10 hours to produce a water-insoluble polymer.

When methyl ester of ethylenediamine dipropionic acid and a bis-epoxy compound are reacted under the condition of an equimolar ratio, a typical reaction of producing a water-soluble polymer is shown below.

Reaction in the first step (Equimolar Reaction)

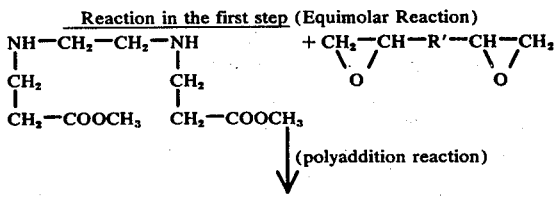

(polyaddition reaction)

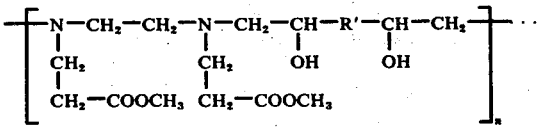

Reaction in the third step

NaOH (saponification)

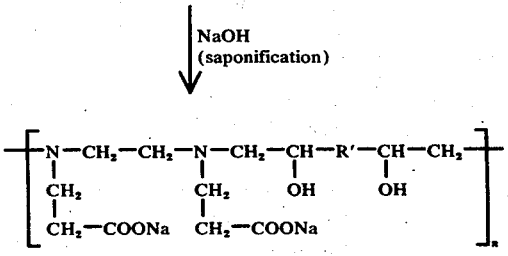

As described above, water-soluble or insoluble polymers having a chelating ability can be very cheaply and easily produced. The chelating polymers are capable of advantageously and cheaply removing detrimental heavy metals in the industrial waste liquids and recovering valuable heavy metals. Moreover, the polymers are expected to have possibility in their application as particularly attractive material in the field of paint, bonding agent, electroconductive polymer, electrostatic inhibitor, flame-proofing agent, ion-exchanging film, ion-exchanging fibers and the like by making the best use of their characteristics.

The present invention will be further described with reference to examples which follow.

EXAMPLE 1

A charge of 50 parts of methyl ester of ethylene diamine di(methylpropionic acid), 73.2 parts of 2,2-bis(p-1,2-epoxypropoxy phenyl)propane and 50 parts of toluene was subjected to polyaddition reaction in a stream of nitrogen at a temperature of 80° to 90° C for 4 hours. After completing the reaction, saponification was carried out with 60.2 parts of an aqueous solution of 30% caustic soda at a temperature of 80° to 100° C for 2 hours. Then water, methanol and toluene were distilled out. The resulting polymer was dried under a reduced pressure, refined by repeated precipitation from a water-acetone medium and again dried under a reduced pressure. Yield was 94.5%. The resulting polymer was a water-soluble white hard powder. It has a nitrogen content of 4.68% as determined by Kjeldahl method (Calc. : 4.76%).

3.0g of an aqueous solution of 15% said polymer was added to 2.0 liters of an aqueous solution of copper sulfate, cadmium sulfate, lead nitrate or mercuric chloride (initial concentration: 20 ppm) and after agitating for 5 minutes, the precipitate was filtered. The concentration of remaining metal ion in the filtrate was determined by atomic absorption spectrum analysis to obtain a removing ratio of 98.5% for copper ion, 99.1% for cadmium ion, 99.5% for lead ion and 87.6% for mercury ion.

EXAMPLE 2

A charge of 100 parts of sodium ethylenediaminediacetate, 220 parts of 1,1-bis(p-1,2-epoxyphenyl)2,3-propane diol(epoxy equivalent: 219.1) and 300 parts of water was subjected to polyaddition reaction in a stream of nitrogen at a temperature of 80° to 90° C for 5 hours. After completing the reaction, the resulting aqueous solution was poured into a large amount of acetone (an amount of 7 to 10 times as much as that of solution) to precipitate a polymer. The polymer was separated and dried under a reduced pressure. Then, the resulting polymer was refined by precipitating repeatedly twice with a water-acetone medium and dried under a reduced pressure. Yield was 80.5%. The polymer product was viscous, white and water-soluble. The nitrogen content determined by Kjeldahl method was 4.12% (Calc. : 4.32%).

3.0 of an aqueous solution of 15% by weight of said polymer was used and a removing ratio of 65.2% for copper ion and 72.3% for lead ion was obtained according to the same method as in Example 1.

EXAMPLE 3

A charge of 50 parts of hexamethylene diamine dipropionitrile, 328.3 parts of polyethylene glycol diglycidyl ether (epoxy equivalent: 365.0) and 50 parts of ethanol was subjected to polyaddition reaction in a nitrogen stream at a temperature of 70 to 80° C for 1.5 hours. After completing the reaction, caustic soda, saponification was carried out with 360 parts of an aqueous solution of 10 wt.% at a temperature of 80° to 100° C for 4 hours until ammonia odor was not detected. After the saponification was finished, a solution of 5% hydrochloric acid was gradually added to the reaction mixture at a temperature of 50° to 60° C to neutralize the same at pH of 6.5 to 7.0. The precipitated polymer was filtered out, well washed with water, and dried under a reduced pressure. The polymer was further repeatedly precipitated twice from a DMF-acetone medium to produce an acid type of polymer. The resulting polymer was in the form of white soft powder. Yield was 84.5%. Nitrogen content was 2.75% (Calc. : 2.86%). The acid type of polymer was dissolved in an appropriate amount of an aqueous solution of 5 wt.% caustic soda at a temperature of 70° to 80° C and then water was distilled out. After drying under a reduced pressure, a soda type of polymer in the form of white hard powder was obtained.

2.6g of an aqueous solution of 15 wt.% said polymer was used and a removing ratio of 89.4% for copper ion and 90.2% for cadmium ion was obtained by following the method in Example 1.

EXAMPLE 4

20 parts of ethylene diamine diacetonitrile and 12.5 parts of butadiene dioxide were charged in an autoclave and reacted at a temperature of 70° to 75° C for 4 hours. After the reaction was finished, saponification was carried out at a temperature of 80° to 100° C for 4 hours with 115.8 parts of an aqueous solution of 10% caustic soda. Thereafter, an acid type of polymer was obtained according to almost the same procedure as in Example 3. The resulting polymer was a white fragile powder. Yield was 91.5%. Nitrogen content was 10.45% (Calc. : 10.68%). The acid type of polymer was treated in a similar manner to that in Example 3 to produce a soda type polymer. The polymer product was of white hard powder.

The method of Example 1 was repeated except that 1.4g of an aqueous solution of 15 wt.% said polymer and a removing ratio of 45.3% for copper ion and 47.1% for cadmium ion was obtained.

EXAMPLE 5

A charge of 100 parts of methyl ester of m-xylenediamine diacetate, 93.5 parts of glycelol diglycidyl ether (epoxy equivalent: 139.5) and 200 parts of ethanol as solvent was subjected to polyaddition reaction in a stream of nitrogen at a temperature of 70° to 80° C for 2 hours with stirring. Then, saponification was conducted at a temperature of 80° to 100° C, with 245 parts of an aqueous solution of 10% hydrochloric acid.

After the saponification was finished, 270 parts of an aqueous solution of 10 wt.% caustic soda was added to the reaction mixture and water, ethanol and methanol were distilled out. The resulting polymer was dried under a reduced pressure. The refining of the polymer was effected in almost the same manner as in Example 1. The resulting polymer was a white hard and brittle powder and its water-solubility was not so good. Yield was 89.4%. Nitrogen content was 4.55% (Calc. : 4.91%).

The method of Example 1 was repeated, except that 3.0g of an aqueous solution of 15 wt.% said polymer and a removing ratio of 87.6% for copper ion and 85.9% for cadmium ion was obtained.

EXAMPLE 6

A charge of 100 parts of ethyl ester of N,N,N'-(tricarboxy-ethyl)diethylene triamine, 52.6 parts of 1,3-bis(1,2-epoxypropoxy)benzene and 150 parts of benzene was reacted in almost the same procedure as in Example 1 and the refining of the polymer product was also conducted similarly, except that in saponification, 297.4 parts of an aqueous solution of 10% caustic soda was employed. Yield was 74.5%. Light yellow soft powdery polymer was obtained. Nitrogen content was 6.91% (Calc. : 7.03%).

2.0g of an aqueous solution of 15 wt.% said polymer was employed and a removing ratio of 92.5% for copper ion and 95.3% for lead ion was obtained in accordance to the same method as in Example 1.

EXAMPLE 7

A charge of 70 parts of methyl ester of N,N,N'N''-(tetra carboxyethyl)triethylene tetramine and 28.3 parts of N,N'-bis(2,3-epoxypropyl)piperazine was subjected to polyaddition reaction with stirring in the stream of nitrogen at a temperature of 90° to 100° C for 1.5 hours. Saponification and refining of polymer were carried out according to almost the same procedure as in Example 1. Light yellow hard powdery polymer having a very good water-solubility was obtained. Yield was 79.4%. Nitrogen content was 11.50% (Calc. : 11.66%).

The method of Example 1 was repeated, except that 1.2g of an aqueous solution of 15 wt.% said polymer was employed and a removing ratio of 91.4% for copper ion and 92.0% for cadmium ion was obtained.

EXAMPLE 8

A charge of 50 parts of methyl ester of N-octyl-N'-carboxy ethyl ethylene diamine, 31.8 parts of ethylene glycol diglycidyl ether and 55 parts of toleuene-ethanol (1:1) was subjected to polyaddition reaction with stirring in the stream of nitrogen at a temperature of 75° to 80° C for 3 hours. Saponification and refining of polymer were conducted in almost the same procedure as in Example 1. The resulting polymer was a white hard powder and its water-solubility was not so good. Yield was 92.5%. Nitrogen content was 6.39% (Calc. : 6.51%).

A charge of 50 parts of methyl ester of N-methyl-N'-carboxy ethyl ethylene diamine, 51.2 parts of ethylene glycol diglycidyl ether and 30 parts of toluene-ethanol (1:1) was reacted almost in the same procedure as stated above to synthesize a polymer. The resulting polymer was a white hard powder and its water-solubility was good.

According to the procedure as in Example 1, 2.2g of an aqueous solution of 10 wt.% of a polymer obtained by using as starting material N-octyl-N'-carboxyethyl ethylene diamine was employed and then the removing ratio was 97.5% for copper ion.

When 1.8g of an aqueous solution of 15 wt.% of a polymer obtained by using methyl ester of N-methyl-N'-carboxymethyl ethylene diamine was employed, the removing ratio was 82.4% for copper ion, and 84.7% for cadmium ion.

EXAMPLE 9

A charge of 100 parts of N-(2-hydroxyoctyl)-N'-(propionitrile)ethylene diamine, 157.4 parts of polypropylene glycol diglycidyl ether (epoxy equivalent: 190.0) and 100 parts of isopropanol was subjected to polyaddition reaction in the stream of nitrogen at a temperature of 80° to 85° C for 3 hours. Then, saponification was carried out with 75.3 parts of an aqueous solution of 20 wt.% hydrochloric acid at a temperature of 80° to 100° C for 4 hours. The mixture was concentrated and dried under a reduced pressure. The product was refined by repeatedly precipitating twice from a DMF-acetone medium to produce an acid type polymer. The polymer product was of white hygroscopic powder. Yield was 82.0% and nitrogen content was 4.23% (Calc. : 4.37%). The acid type polymer was treated in the same manner as in Example 3 to produce a soda type polymer. The resulting polymer was white and elastic a little and water-soluble.

When 3.0g of an aqueous solution of 15 wt.% said polymer was employed, a removing ratio of 99.2% for copper ion, 99.4% for cadmium ion and 99.3% for lead ion was obtained according to the procedure of Example 1.

EXAMPLE 10

A charge of 65 parts of butyl ester of ethylene diamine dipropionic acid and 82.6 parts of sorbitol diglycidyl ether (epoxy equivalent: 150) was subjected to polyaddition reaction in the stream of nitrogen at a temperature of 70° to 80° C for 1.5 hours and then cooled to a temperature of 30° to 40° C. 2.85 parts of diethylene triamine was added to the reaction mixture. 80% of the resulting mixture was shaped in the form of a film. Another 20% of the mixture was diluted with toluene to an amount of 20 times and applied thinly on a pretreated nylon cloth. Both the film and the cloth were heated at a temperature of 130° to 150° C for 7 hours to conduct the curing reaction. The cured film was colorless, clear, flexible and brittle so that it could be easily crushed to a particle size of 40 to 100 mesh. The coated nylon cloth was white and less flexible. After the finely divided polymer and the coated nylon cloth were saponified in an aqueous solution of 10% caustic soda at a temperature of 80° to 100° C for 2 hours, they were sufficiently washed with distilled water and dried under a reduced pressure. The finely divided polymer and the coated nylon cloth were white, hard and water-insoluble. Yield of the finely divided polymer was 98.4%. By the use of the cured polymer after saponification, the total exchanging capacity for various kinds of heavy metals according to a batch test method was conducted and their values were determined in the following manner.

More specifically, into the respective aqueous solutions (initial concentration: 300 ppm) of copper sulfate, cadmium sulfate, lead nitrate and mercuric chloride was added 1.0g of the cured polymer, and the mixture was stirred gently at room temperature for 3 hours. After leaving the mixture to stand for 20 hours, it was filtered.

The metal ion content (ppm) in the filtered liquid was determined by atomic absorption spectrum analysis to seek the total exchanging capacity.

In case said cured polymer of 40–60 mesh after saponification was used, the total exchanging capacity was noted to be 30.5 g/kg-R for copper ion, 54.1 g/kg- R for cadmium ion, 96.7 g/kg-R for lead ion and 102.0 g/kg-R for mercury ion.

EXAMPLE 11

A charge of 100 parts of m-xylene diamine di(2-methylpropionitrile), 181.8 parts of 2,2-bis-(p-1,2-epoxypropoxy phenyl)propane and 150 parts of benzene was subjected to polyaddition reaction with stirring in the stream of nitrogen at a temperature of 70° to 80° C for 4 hours, cooled to a temperature of 30° to 40° C, mixed with 4.6 parts of ethylene diamine, shaped in the form of film and while removing benzene, cured at a temperature of 100° to 120° C for about 10 hours. There was produced a clear hard slightly resilient cured film of pale yellow. One half of the cured film was ground to a particle size of 10 to 60 mesh and subjected to saponification reaction in an aqueous solution of 10% caustic soda at a temperature of 80° to 100° C for 4 hours, while the other half was treated in the same way as it was in the form of film. After saponification, the cured polymers were filtered, washed sufficiently with water, then with acetone, and dried under a reduced pressure. There were produced light yellow, hard and tough cured polymers which were insoluble in water and organic solvent. Yield was 99.5%. The total exchanging capacities for $cu^{2+}$ and $Cd^{2+}$ determined by the method described in Example 10 except that the cured polymer of 40 to 60 mesh was used were noted to be 32.9 g/kg-R for copper ion and 60.2 g/kg-R for cadmium ion.

EXAMPLE 12

A charge of 100 parts of poly(2-methyl ethylene imine), 94.0 parts of methacrylonitrile and 100 parts of ethanol-toluene (1:1) was subjected to addition reaction at a temperature of 70 to 80° C for 6 hours, cooled to a temperature of 40° C, mixed with 41.6 parts of vinylcyclohexane-dioxide (epoxy equivalent: 70.1), further subjected to polyaddition reaction in the stream of nitrogen at a temperature of 80° to 90° C for 10 hours, cooled again to a temperature of 30° to 40° C, mixed with 2.1 wt.% of diethylene triamine, shaped in the form of film and cured at a temperature of 150° to 180° C for 20 hours while removing ethanol and toluene. There was produced a clear light yellow hard brittle cured film. The cured film was ground to a particle size of 40 to 100 mesh. The finely divided polymer was saponified in an aqueous solution of 20% hydrochloric acid at a temperature of 80° to 100° C for 3 hours, then mixed with 309 parts of a solution of 20% caustic soda, stirred at a temperature of 60° to 70° C for 1 hour, thereafter filtered, washed sufficiently with water, then with acetone and dried under a reduced pressure. There was produced a light yellow cured polymer which was insoluble in most organic solvents. Yield was 98%. The total exchanging capacity for mercury ion determined according to the method described in Example 10 with the cured polymer of 40 to 60 mesh was 205.5 g/kg-R, and 63.2 g/kg-R for copper ion.

EXAMPLE 13

A charge of 100 parts of poly(2,2-dimethyl ethyleneimine), 126.1 parts of butyl acrylate and 100 parts of ethanol was subjected to Michael addition reaction at a temperature of 70° to 80° C for 8 hours, cooled to a temperature of 40° C, mixed with 88.3 parts of 1,4-bis(1,2-epoxypropoxy)benzene, subjected to polyaddition in the stream of nitrogen at a temperature of 70° to 80° C for 3 hours, cooled again to a temperature of 30° to 40° C, mixed with 10 parts of triethylene tetramine, shaped in the form of film, and while removing ethanol, cured at a temperature of 120° to 130° C to 10 hours. A clear, colorless resilient and tough cured film was obtained. The cured film was saponified, as it was, in an aqueous solution of 10% caustic soda at a temperature of 80° to 100° C for 4 hours. After the saponification, it was sufficiently washed with water and dried to produce a white hard cured polymer which was insoluble in water and organic solvents. Yield was 84.6%. The total exchanging capacity for mercury ion determined in accordance with the method described in Example 10 with the cured polymer of 40 to 60 mesh was 261 g/kg-R, and 81.6 for copper ion.

EXAMPLE 14

A charge of 50 parts of polyethyleneimine, 92.9 parts of methyl crotonate and 100 parts of toluene-ethanol (1:1) was subjected to addition reaction at a temperature of 70° to 80° C for 8 hours, cooled to a temperature of 40° C, mixed with 81.0 parts of 2,2-bis(p-1,2-epoxy-propoxy phenyl)propane and subjected to polyaddition reaction in the stream of nitrogen at a temperature of 70° to 80° C for 2.5 hours. The reaction solution was cooled to a temperature of 30° to 40° C, mixed with 5 parts of diethylene triamine, shaped in the form of film and while removing toluene, ethanol and the like, cured at a temperature of 120° to 130° C for 6 hours. The resulting polymer was clear pale yellow, hard and brittle so that it was easily ground to a particle size of 40 to 100 mesh. It was saponified in the same procedure as in Example 10 to produce a light yellow, hard and a little brittle cured polymer which was insoluble in water and most organic solvents. Yield was 93.5%. The total exchanging capacity for mercury ion determined according to the procedure described in Example 10 with the cured polymer of 40 to 60 mesh was 287 g/kg-R, and 99.7 g/kg-R for copper ion.

EXAMPLE 15

A charge of 100 parts of penta ethylene hexamine and 185.2 parts of methyl acrylate was subjected to Michael addition reaction in the stream of nitrogen at a temperature of 70° to 80° C for 6 hours, thereafter the resulting mixture was cooled to 40° C, followed by the addition thereto of 121.5 parts of propylene glycol diglycidyl ether and 250 parts of toluene. The resulting charge was subjected to polyaddition reaction in the stream of nitrogen at a temperature of 70° to 80° C for 4 hours. The reaction solution was directly shaped into a film form and was cured at a temperature of 125° to 130° C for 8 hours. The cured film thus obtained was of light yellow color and transparent, and was soft and elastic. The film was crushed to particles of 40 to 100 mesh. Saponification was carried out in a manner similar to that in Example 10. Thus, a cured polymer which was hard and light yellow in color and insoluble in water and in most organic solvents was obtained. Yield was 94.8%. By using the cured polymer of 40 to 60 mesh, the total exchanging capacity was determined according to the method of Example 10, and the result was noted to be 58.4 g.kg-R for copper ion and 181 g/kg-R for mercury ion.

EXAMPLE 16

A charge of 100 parts of copolymer of ethylene imine and N-cyanomethyl ethylene imine (molar ratio: 1.9)

and 21.8 parts of 2,2-bis(p-1,2-epoxypropoxy phenyl)-propane was subjected to polyaddition reaction in the stream of nitrogen at a temperature of 70° to 80° C for 3 hours. The resulting polymer was directly shaped into a film form and its curing was conducted at a temperature of 130° to 135° C for 7 hours. The resulting cured film was a light yellow, transparent, hard and brittle film. This film was crushed into particles of 60 to 100 mesh. Their saponification was conducted in a manner similar to that of Example 10. As a result, a cured polymer which was hard and light yellow in color and insoluble in water and in most organic solvents was obtained. Yield was 94.8%.

Using the cured polymer of 60 to 80 mesh, the total exchanging capacity was sought according to the method of Example 10 with the result that it showed 69.4 g/kg-R for copper ion and 224 g/kg-R for mercury ion.

EXAMPLE 17

A charge of 200 parts of copolymer of ethylene imine and methyl ester of N-ethyleneglycine (molar ratio: 0.5 : 9.5) and 26.2 parts pentaerythritol diglycidyl ether was subjected to polyaddition reaction in the stream of nitrogen at a temperature of 70° to 80° C for 1 hr. The resulting polymer was directly shaped into a film form which was then cured at a temperature of 120° to 130° C for 10 hours. The cured film thus obtained showed to be light yellow and transparent and was soft and brittle. This film was crushed into particles of 20 to 80 mesh. The saponification reaction was carried out in the manner of Example 10. As a result, a cured polymer which was hard, yellow and which was insoluble in water and in most organic solvents was obtained. Yield was 97.4%.

Using the cured polymer of 40 to 60 mesh, the total exchanging capacity was sought according to the method of Example 10. The result showed to be 69.5 g/kg-R for copper ion and 210 g/kg-R for mercury ion.

Also, 40g of the cured polymer of 40 to 50 mesh was charged in a column, to which was passed 20 liters, at sv = 20, of an aqueous solution of copper sulfate whose copper ion concentration was 100 ppm. The treated liquid showed the presence of copper ion. The total exchanging capacity for copper ion was 50 g/kg-R. Then, to a resin having adsorbed copper ion was passed, at sv = 2, a charge of 200 ml of 2N-hydrochloric acid. The recoverability was noted to be 78.5%.

EXAMPLE 18

A charge of 100 parts of a copolymer of ethylene imine and N-cyanoethyl ethylene imine (molar ratio: 1 : 3) and 51.3 parts of polyethyleneglycol diglycidyl ether was subjected to polyaddition reaction in the stream of nitrogen at a temperature of 75°–80° C for 2 hours. The resulting polymer was directly shaped into film form, followed by curing of same at a temperature of 120°–130° C for 9 hours. The cured film thus obtained was yellow and transparent, soft and elastic. Saponification reaction was conducted in a manner similar to that of Example 10. The resulting cured polymer was light yellow, hard and insoluble in water and in most organic solvents. Yield was 95.6%.

Using the cured polymer of 40–60 mesh, the total exchanging capacity was sought according to the method of Example 10. The result showed to be 60.3 g/kg-R for copper ion and 174 g/kg-R for mercury ion.

EXAMPLE 19

A charge of 100 parts of a copolymer of ethylene imine and methyl ester of N-carboxyethyl ethyleneimine (molar ratio: 2 : 8) and 40 parts of 2,2-bis(p-1,2-epoxypropoxy phenyl)propane was subjected to polyaddition reaction at a temperature of 70°–80° C for 3 hours, followed by cooling it 30°–40° C. To this mixture was added 3 parts of diethylene triamine as the hardening agent, and after shaping the polymer into film form, the latter was subjected to curing at a temperature of 120°–130° C for 9 hours. The resulting cured film was hard, elastic and tough. The cured film thus obtained was crushed into particles of 40–100 mesh. The saponification reaction was carried out in a manner similar to that of Example 10. Yield was 96.4%.

Using the cured polymer of 40–60 mesh, the total exchanging capacity was sought according to the method of Example 10, with the result that it showed 68.1 g/kg-R for copper ion and 210 g/kg-R for mercury ion.

EXAMPLE 20

A charge of 30 parts of poly(2-ethyl ethyleneimine), 13.4 parts of acrylonitrile and 50 parts of ethanol was subjected to addition reaction at a temperature of 70° to 80° C for 10 hours, cooled to a temperature of 40° C, mixed with 17.9 parts of 1,4-bis(1,2-epoxy propoxy)-benzene and 50 parts of toluene, subjected to polyaddition reaction in the stream of nitrogen at a temperature of 70° to 80° C for 4 hours. The resulting polymer was directly shaped into film form, and subjected to curing at a temperature of 120°–130° C for 13 hours while removing ethanol and toluene. The cured film thus obtained showed a light yellow, transparent, hard and brittle one. This film was crushed into particles of 60–100 mesh. Saponification was conducted in a manner similar to that of Example 10. Yield was 97.4%.

The total exchanging capacity for $Cu^{2+}$ determined by the method described in Example 10, except that the spherical particles of the cured polymer of 60 to 80 mesh were employed, was 50.9 g/kg-R.

EXAMPLE 21

A charge of 100 parts of poly(cis-2,3-dimethyl ethylene imine), 94.7 parts of methyl acrylate and 100 parts of toluene-ethanol (1:1) was subjected to Michael addition reaction at a temperature of 70° to 80° C for 8 hours, cooled to a temperature of 40° C, mixed with 158.1 parts of 2,2-bis(p-1,2-epoxypropoxy phenyl)propane, subjected to polyaddition reaction in the stream of nitrogen at a temperature of 70° to 80° C for 3 hours and mixed with 10 parts of diethylene triamine. The resulting polymer was shaped into film form, and this film was subjected to curing at a temperature of 120°–130° C for 12 hours while removing toluene and ethanol. The resulting film was crushed into particles of 20–60 mesh. Saponification of these particles was carried out in a manner similar to that of Example 10, with the result that a cured polymer which was hard, yellow and insoluble in water and most organic solvents was obtained. Yield was 95.8%.

The total exchanging capacity was determined by the method described in Example 10, except that the particles of the cured polymer of 40 to 60 mesh were employed. The result was 61.7 g/kg-R for copper ion and 190.4 g/kg-R for mercury ion.

EXAMPLE 22

A charge of 100 parts of polyethylene imine, 140 parts of methyl acrylate and 150 parts of toluene-ethanol (1:1) was subjected to Michael addition reaction at a temperature of 70° to 80° C for 3 hours, cooled to a temperature of 40° C, mixed with 74.0 parts of 1,3-bis(1,2-epoxy-propoxy)benzene and subjected to polyaddition reaction in the stream of nitrogen at a temperature of 70° to 80° C for 3 hours. The resulting polymer was directly shaped into film form which was then subjected to curing at a temperature of 120°–130° C for 14 hours while removing toluene and ethanol. The resulting cured film was crushed into particles of 40–80 mesh and they were subjected to saponification in a manner similar to that of Example 10. Yield was 97.4%.

The total exchanging capacity was determined by the method described in Example 10, except for using the particles of the cured polymer of 40 to 60 mesh. The result was noted to be 67.3 g/kg-R for copper ion and 209 g/kg-R for mercury ion.

EXAMPLE 23

The coated nylon cloths and cured films obtained after saponification in Examples 10 and 11 were tested with a vibrating reed electrometer of the type of TR804M (available from Takeda Riken Co. Ltd.) to determine their specific surface resistance. The specific surface resistance of the coated nylon was $2.3 \times 10^8 \Omega$ and that of the cured film was $4.4 \times 10^7 \Omega$ at an applied voltage of 1000V for an applying time of 4 seconds.

The coated nylon cloth obtained in Example 10 was dipped in an aqueous solution of copper sulfate for 3 hours. Thereafter, it was sufficiently washed with water and dried under a reduced pressure. The copper ion adsorbed surface of the coated nylon had a specific surface resistance of $8.4 \times 10^6 \Omega$.

EXAMPLE 24

An aqueous solution of 5 wt.% of the water soluble polymer obtained in Example 1 was applied with a brush on a soft steel plate and dried at a temperature of 50° C for 12 hours under a reduced pressure to produce a thin clear and good coating film. This coated plate was left to stand as it was for 6 months in a room. No rust formation was found on the soft steel plate, showing a good restproofing effect of the polymer. When the coated plate after standing for 6 months was dipped in water at a temperature of 50° C for about 1 hour, all the coating film of the water-soluble polymer was clearly removed out of the surface of the metal plate.

A charge of 65 parts of butyl ester of ethylene diamine dipropionic acid and 82.6 parts of sorbitol diglycydyl ether (epoxy equivalent: 150) was subjected to polyaddition reaction in the same procedures as in Example 10, cooled to a temperature of 30° to 40° C, sufficiently mixed with 2.85 parts of diethylene triamine and 520 parts of toluene, applied thinly on a soft steel plate and cured at a temperature of 130° to 150° C for 7 hours. The coated plate after curing was found to have excellent corrosion-resistance and rustproofing effect as follows:

| | Coating film of the present invention |
|---|---|
| Alkali spray (15 hrs.) | No change |
| Salt spray (500 hrs.) | No change |
| Checker test for adhesiveness | 90/100 or more |

We claim:

1. A chelating polymer produced by saponifying a polymer with acid or alkali, said polymer being produced by reacting a bis-epoxy compound with a poly-N-substituted polyamine or a poly-N-substituted polyalkylene imine, which polyamine or imine has been obtained by substituting an alkyl ester of a carboxyalkyl group or a cyanoalkyl group for active hydrogen atoms bonded to nitrogen atoms of a polyamine or a polyalkylene imine in a manner such that at least two of said active hydrogen atoms remain.

2. A chelating polymer as claimed in claim 1, wherein said poly-N-substituted polyamine has been obtained from a polyamine having the general formula: R-NH(R'NH)$_n$H where R is hydrogen or an alkyl group having 1 to 8 carbon atoms or a β-hydroxy alkyl group having 2 to 8 carbon atoms, R' is an ethylene, phenylene or xylene group and n is 1 or 2.

3. A chelating polymer as claimed in claim 1 wherein said poly-N-substituted polyalkylene imine has been obtained from a polymer of ethylene imine, 2-methyl ethylene imine, 2-ethyl ethylene imine, 2,2-dimethyl ethylene imine, cis-2,3-dimethyl ethylene imine, or trans-2,3-dimethyl ethylene imine, or from a copolymer of ethylene imine and N-substituted ethylene imine.

4. A chelating polymer as claimed in claim 1, wherein, as the N-substituent of the polyamine or imine, a cyanoalkyl group of the general formula (CHR')$_n$CN, where R' is hydrogen or a methyl group and n is 1 or 2, is used.

5. A chelating polymer as claimed in claim 1, wherein, as the N-substituent of the polyamine or imine, an alkali metal salt or alkyl ester of a carboxyalkyl group having the general formula (CHR')$_n$COOR'', where R' is hydrogen or a methyl group, R'' is an alkali metal or an alkyl group having 1 to 4 carbon atoms, and n is 1 or 2, is used.

6. A chelating polymer as claimed in claim 1, wherein the bis-epoxy compound is 1,3-bis(1,2-epoxy propoxy) benzene, 1,4-bis(1,2-epoxy propoxy)benzene, 2,2-bis(p-1,2-epoxy propoxy phenyl)propane, N,N'-bis(2,3-epoxy propyl)piperazine, 1,1-bis(p-1,2-epoxy propoxy phenyl)-2,3-propane diol, ethylene glycol diglycidyl ether, propylene glycol diglycidyl ether, glyceroldiglycidyl ether, pentaerythritol diglycidyl ether, sorbitol diglycidyl ether, polyethylene glycol diglycidyl ether, polypropylene glycol diglycidyl ether, vinylcyclohexene dioxide or butadiene dioxide.

7. A chelating polymer according to claim 1, wherein the bis-epoxy compound is polyethylene glycol diglycidyl ether and wherein the poly-N-substituted polyamine is hexamethylene diamine dipropionitrile.

8. A chelating polymer according to claim 1 wherein said bis-epoxy compound is 2,2-bis(p-1,2-epoxy propoxy phenyl) propane and wherein said poly-N-substituted polyamine is m-xylene diamine di(2-methylpropionitrile).

9. A chelating polymer according to claim 1, wherein said bis-epoxy compound is 2,2-bis(p-1,2-epoxy propoxy phenyl) propane and wherein said poly-N-substituted polyamine is a reaction product of polyethylene imine and methyl crotonate.

10. A chelating polymer according to claim 1, wherein said bis-epoxy compound is propylene glycol diglycidyl ether and wherein said poly-N-substituted polyamine is the reaction product of pentaethylene hexamine with methyl crotonate.

11. A chelating polymer according to claim 1, wherein said bis-epoxy compound is 2,2-bis(p-1,2-epoxy propoxy phenyl) propane and wherein said poly-N-substituted polyamine is a copolymer of ethylene imine and N-cyanomethyl ethylene imine.

12. A chelating polymer according to claim 1, wherein said bis-epoxy compound is 1,3-bis(1,2-epoxy propoxy) benzene and wherein said poly-N-substituted polyamine is the reaction product of polyethylene imine and methyl acrylate.

* * * * *